MEANS FOR SECURING A MAGNETIC TAPE TO MOTION PICTURE FILM

Filed Feb. 16, 1973 4 Sheets-Sheet 1

MEANS FOR SECURING A MAGNETIC TAPE TO MOTION PICTURE FILM

Filed Feb. 16, 1973

United States Patent Office 3,834,972
Patented Sept. 10, 1974

3,834,972

MEANS FOR SECURING A MAGNETIC TAPE TO MOTION PICTURE FILM

Robert Sava, Yonkers, N.Y., assignor to Thaddeus E. Owens, Brooklyn, N.Y.

Filed Feb. 16, 1973, Ser. No. 333,009
Int. Cl. B32b *31/00*; B65c *11/04*
U.S. Cl. 156—517 8 Claims

ABSTRACT OF THE DISCLOSURE

A process and apparatus for automatically and continuously applying a thin, narrow magnetic tape to a thicker, wider plastic motion picture film comprising moving the film at a prescribed speed before a milling cutter which cuts a groove in a margin of the film and a bead of an adhesive binder is continuously applied to the groove. A magnetic tape, under proper tension and speed, is applied continuously to the adhesive coated groove. Calendering rollers apply progressive greater pressure to the tape to secure it in place and the composite film and tape are buffed and wound on a takeup reel.

This invention concerns a method and apparatus whereby an audio magnetic tape may be applied to a margin of a motion picture film in such manner that the original width and thickness of the film is not changed.

In prior systems, such as that described in U.S. Pat. 2,982,003, which is typical, these critical requirements were not met completely and uniformly. In addition prior systems employed very complex equipment to insure compliance with rigid specifications. The present invention accomplishes the desired results in a relatively simple manner. The process involves the following basic steps:

1. Grooving the film.
2. Application of adhesive binder.
3. Applying the magnetic tape under automatic tension control.
4. Calendering the tape on the film.
5. Buffing and vacuum cleaning the tape.

The process will be described in connection with 8 mm. film to which is applied polyvinyl magnetically coated tape which may be 1.5 mils thick and 0.029 inches wide.

The film is passed around a guide roller and is grooved by a rotating driven milling cutter wheel held a fixed radial distance from the roller.

An applicator wheel rotating in the opposite direction to that of film travel is partially submerged in a well containing the binder. The applicator wheel deposits a bead of adhesive in the groove.

The tape is applied to the groove and passes along successive stages of calendering to complete pressing the magnetic tape into the groove and smooth it to a high degree of flatness corresponding to the smoothness of the film.

After the tape is calendered it is buffed and then vacuum cleaned to remove loose particles and leave the composite film and tape dust-free.

It is therefore a principal object of the present invention to provide a method and apparatus for grooving a transparent motion picture film and for securing an audio magnetic tape in the groove.

A further object of the present invention is to provide a method and means as described wherein the positions of the film and tape are precisely controlled while adhesive binder is being applied to the groove and while the tape is being secured in the groove.

Another object of the present invention is to provide a method and means as described, wherein the composite tape and film are calendered by a circumferentially arranged series of calendering rollers to complete setting the tape in the film groove.

A further object of the present invention is to provide a method and means as described wherein the calendered tape secured to the film is buffed and vacuum cleaned.

These and other objects and many of the attendant advantages of this invention will be readily appreciated as the same becomes better understood by reference to the following detailed description when considered in connection with the accompanying drawings in which.

Figure 1:
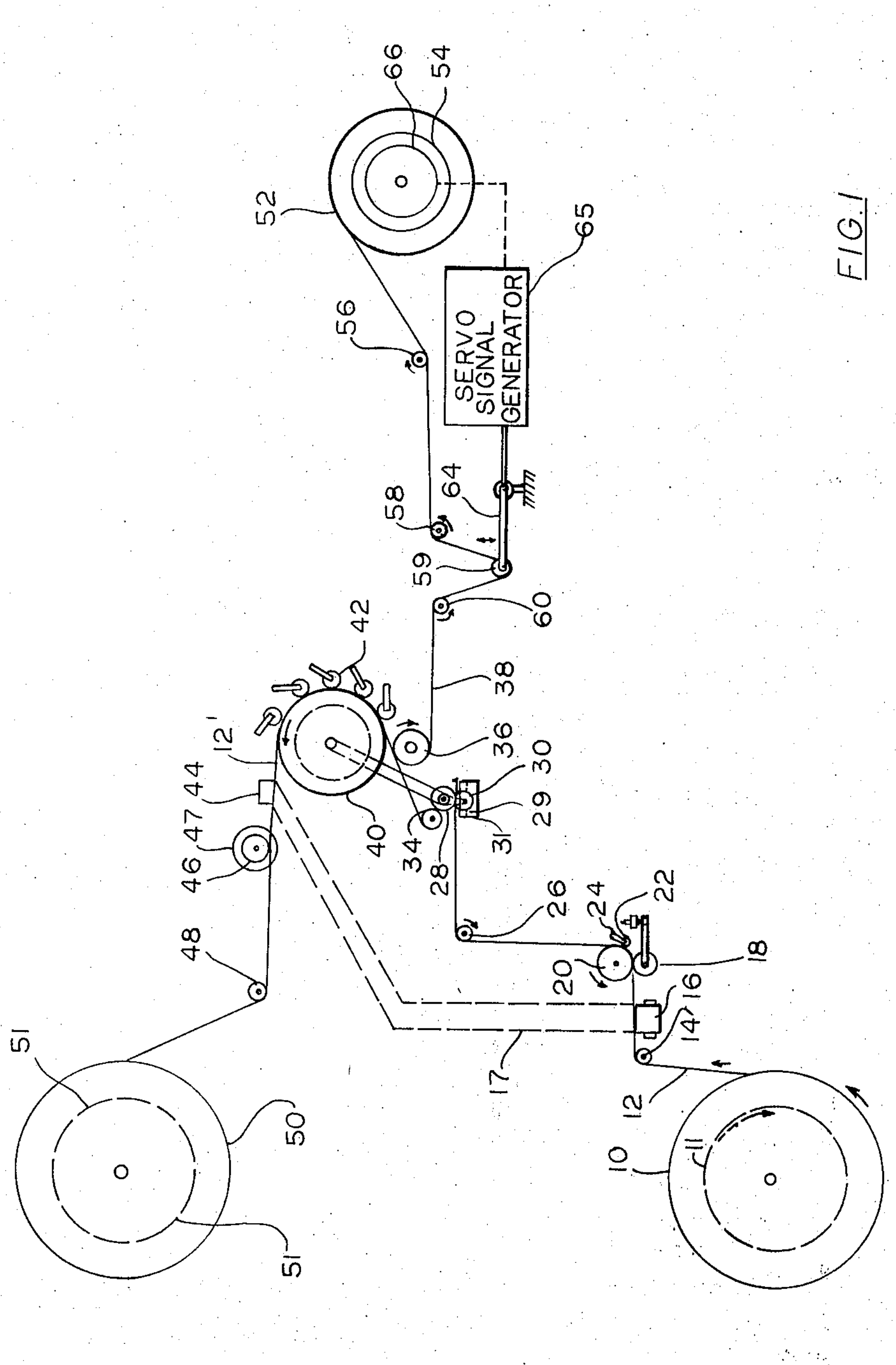
FIG. 1 is a diagram of apparatus used for applying a magnetic tape to a motion picture film.

Referring now to the drawings wherein like reference characters designate like or corresponding parts throughout, there is shown a rotatable feed reel 10 braked by a reverse torque motor 11. The reel 10 carries a motion picture film 12, which is fed over an idler roller 14 and passes across outlet 16 of a vacuum duct 17 which draws off any dust or loose particles on the underside of the film 12. The film 12 then passes between a rotary milling cutter head 18 and a rotary guide wheel 20 where a groove or rabbet 24 (FIGS. 7 and 8) is cut at one edge of the film 12. An idler roller 22 carried by an arm 24 helps hold the film 12 in place on the wheel 20. After the groove is cut into the film 12 the film passes upwardly over a driven roller 26 and around a driven roller 28. A suitable liquid adhesive 29 is applied to the groove 74 in the film 12 by an applicator roller 30 partially submerged in a container 31 of the adhesive 29.

The film 12 is then drawn around an idler roller 34 and over a magnetic tape carrying roller 36. A magnetic tape 38 is placed in the groove 74 in the film 12 and the tape adheres to the adhesive in the groove 74. Then the composite film and tape 12' passes around a driven sprocket transport roller 40. A series of calendaring rollers 42 press the tape 38 in the film groove 74 and smooth the tape so that it is uniform with the adjacent surface of the film 12. Then the composite film and tape 12' is passed under an outlet 44 of the vacuum duct 17 which sucks away any loose particles. Finally the composite film and tape 12' passes under a buffing wheel 46 (driven by a motor 47) such that the magnetic tape surface is polished. Finally the composite film and tape 12' passes under an idler roller 48 to a take-up reel 50 driven by a motor 51.

The magnetic tape 38 is carried on a supply reel 52 controlled by conventional tape tensioning system including a brake 54. The tape passes under idler roller 56 and around three idler rollers 58, 59 and 60 to the roller 36. The roller 59 is a freely movable dancer roller carried by a pivotable arm 64. The dancer roller 59 keeps the tape in proper tension. An arm 64 actuates a conventional servosignal generating device 65 which operates a servomotor 66 to control the brake 54, so that the tape 38 passes off the reel 52 at a proper speed.

Figures 4, 7, 8:
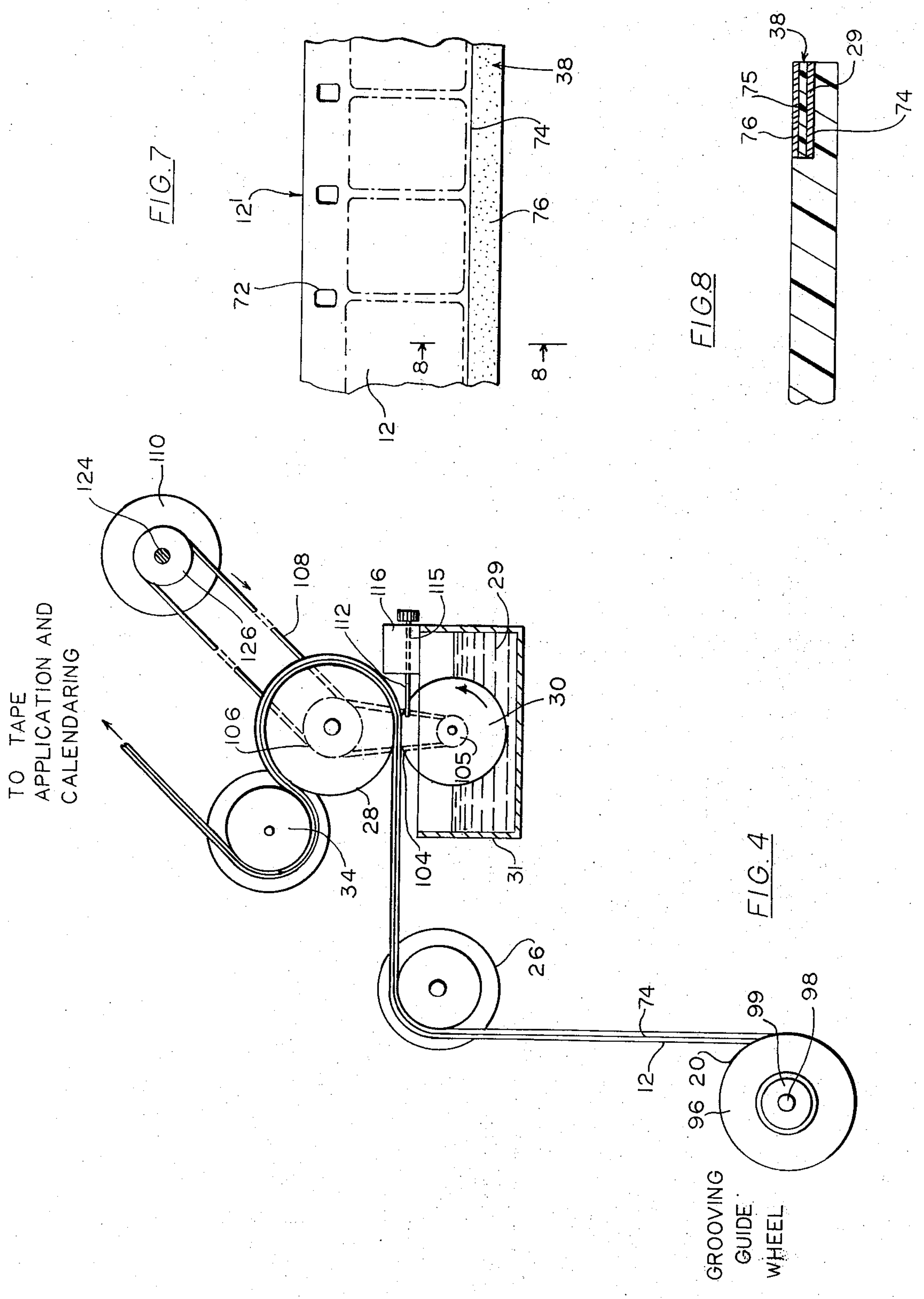
FIG. 4 shows details of the arrangement for applying adhesive to the grooved film.
FIG. 7 is a plan view of part of a motion picture film with magnetic tape secured in place.
FIG. 8 is an enlarged fragmentary cross sectional view taken along line 8—8 of FIG. 7.

FIG. 7 and FIG. 8 show details of the finished composite film and magnetic audio tape 12'. The film 12 has a plurality of conventionally spaced sprocket holes 72 at one edge with the groove or rabbet 74 formed in the opposite edge. The audio tape 38 is a laminated structure consisting of a plastic film 75 such as polyvinyl chloride coated with a magnetic layer 76. The adhesive layer 29 secures the tape 38 in place in the groove 74. In a practical embodiment employing motion picture film which is 0.314 inches (8 mm.) wide, the groove 74 and the tape 38 will both be about 0.030 inches wide and the groove will be 0.0015 inches deep as mentioned previously. The same basic process and arrangement of apparatus may be used for attaching magnetic tapes of other widths to motion picture films such as 16 mm. and 35 mm. film. After the tape 38 is applied, the film 12 may be coated with photographic emulsion in conventional manner.

Figure 3:
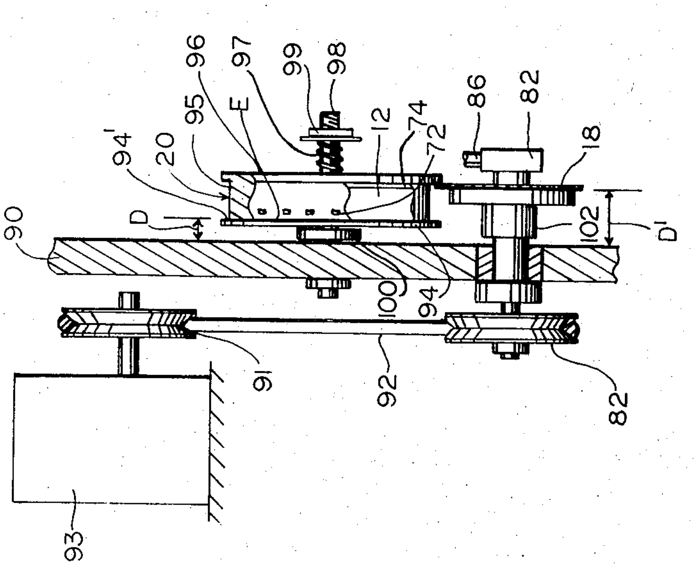
FIG. 3 is a vertical sectional view taken along line 3—3 of FIG. 2.
Figure 2:
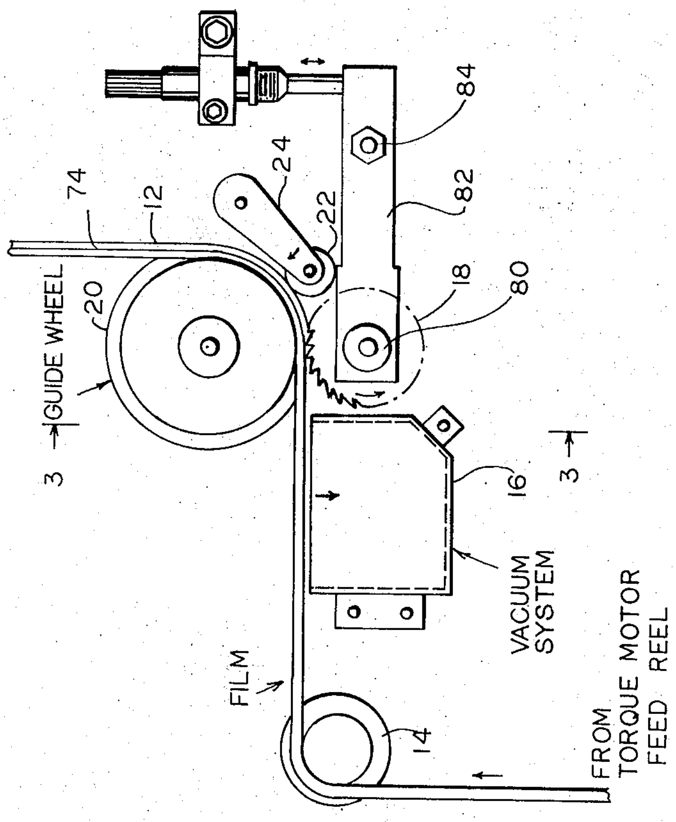
FIG. 2 shows details of the arrangement for grooving the motion picture film.

FIGS. 2 and 3 show details of the film grooving arrangement of the apparatus. The milling cutter wheel 18 is supported rotatably by a ball bearing assembly 80 carried by an arm 82 pivotally supported by a locking pivot 84. A micrometer caliper 86 contacts the distal end of the arm 82 and serves to adjust the distance between the cutting edge of the cutter wheel 18 and the adjacent periphery of the guide wheel 20. The cutter wheel 18 is carried by a shaft 88 journaled in a vertical wall 90 (see FIG. 3). The shaft 88 carries a pulley 91 on which is entrained a drive belt 92 driven by a motor 93.

The guide wheel generally designated as reference numeral 20 in FIG. 3 has a two-part structure. A circular end wall 94 provides an annular margin 94' around a cylindrical portion 95 of an axially adjustable wheel section 96. The margin 94' serves as an abutment for the left edge E of the film 12. A spring 97 carried by a shaft 98 is adjustable by a nut 99 to press the wheel section 96 against the end wall 94. Distance D and D' are precisely maintained by spacers 100 and 102 to insure that the rabbet 74 is properly located and has a specified width within close tolerances. This arrangement eliminates the need for sensing arms heretofore used in prior film grooving apparatus to monitor the position of the film while being grooved.

FIG. 4 shows details of the arrangement for applying glue or other adhesive 29 to the groove 74. The applicator wheel 30 rotates in a well 31 containing the adhesive 29. The wheel 30 is driven by a belt 104 entrained around a pulley 105 carried by the wheel 30 and around a pulley 106 carried by the guide roller 28. The roller 28 is driven by a belt 108 which is driven by a motor 110. A scraper or doctor blade 112 scrapes one or both sides of the wheel 30 to insure that only the outer periphery of the wheel is coated with the adhesive 29. The position of the scraper blade 112 is adjustable by means of a lock nut 114 on a threaded end 115 of the blade 112 which is axially adjustable in a stationary block 116.

Figure 6:
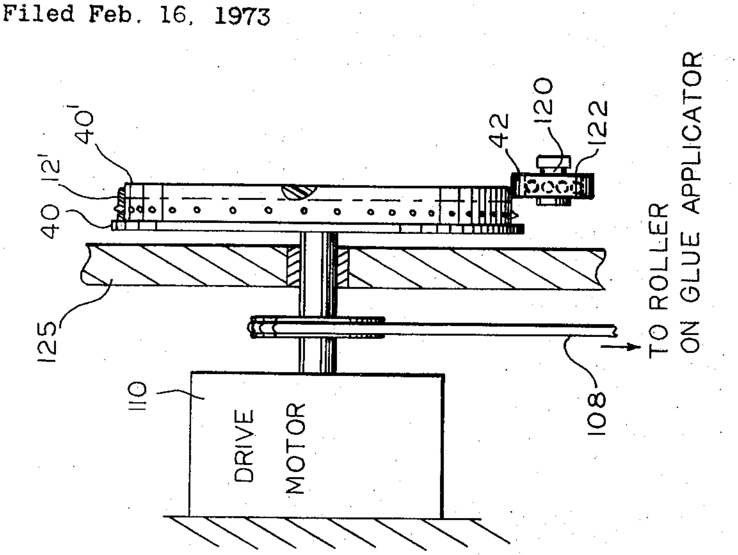
FIG. 6 is a vertical sectional view taken along line 6—6 of FIG. 5.
Figure 5:
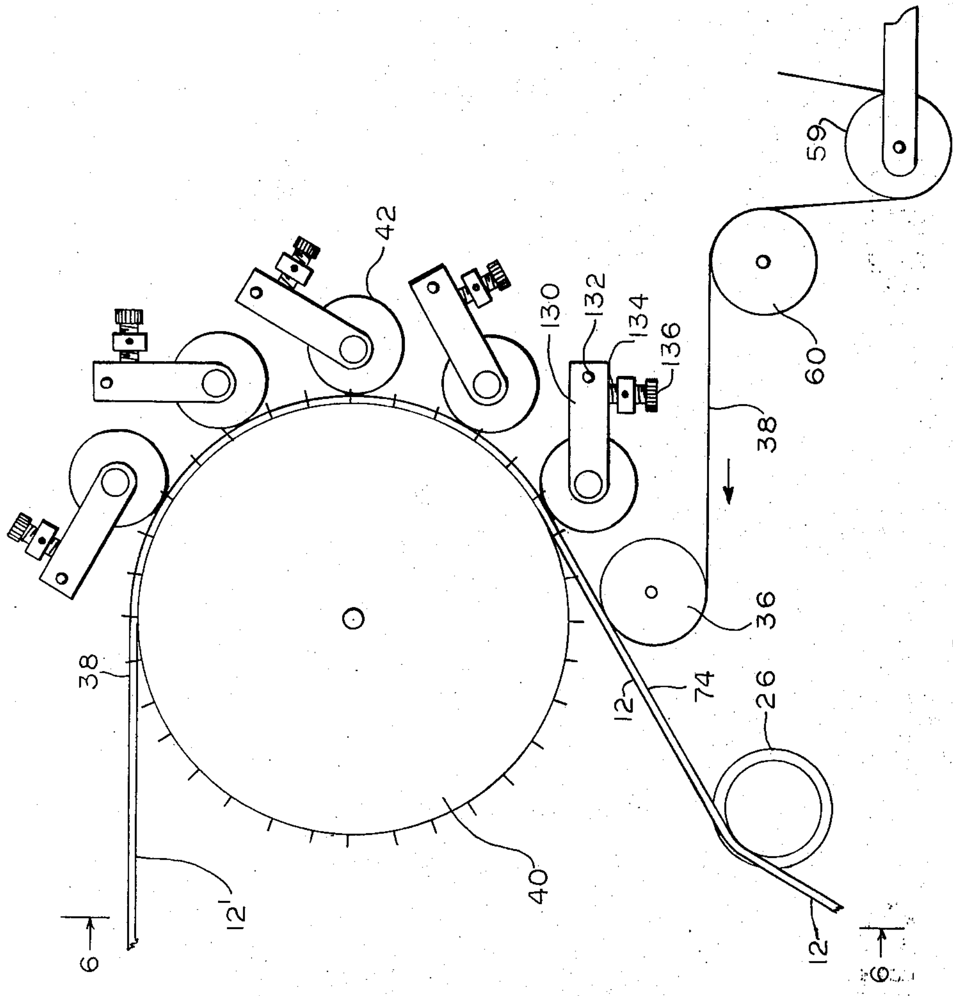
FIG. 5 shows details of the arrangement for calendering the magnetic tape applied to the grooved film.

FIGS. 5 and 6 show details of the arrangement for applying the audio magnetic tape 38 to the groove 74 and the spaced sprocket holes 72 in the film 12. The sprocket over the roller 60 in proper tension determined by the tension control system including the dancer roller 59. The tape 38 is fed around the roller 36 and is guided into the adhesive coated groove 74. The film 12 is held in proper position by the sprocket wheel 40 whose teeth engage in the spaced sprocket holes 72 in the film 12. The sprocket wheel 40 has a cylindrical hard rubber or plastic section 40' against which the callendar rollers 42 roll. These rollers are carried by bearing races 120 journaled in ball bearings 122. The motor 110 has a shaft 124 carrying a pulley 126 on which is entrained the belt 108 which drives the adhesive applicator wheel 30. The shaft 124 extends through a stationary wall 125 in which the shaft is journaled and drives the sprocket wheel 40 directly.

The callendar rollers 42 are radially adjustable different distances from the wheel 40 and are arranged circumferentially. Each callendar roller 42 is located closer to the periphery of wheel 40 viewed in counterclockwise direction in FIG. 5. Adjustment is made possible by a supporting arm 130 pivotally mounted on a pin 132. The arm 130 is adjustably positionable angularly by a bolt 134 bearing on the arm 130 and lockable in position by a lock nut 136.

It will be apparent that the system described makes possible precision mounting of an audio magnetic tape in a groove or rabbet formed precisely at one marginal edge of a flexible motion picture film. Tapes of different widths may be applied to films of different widths and thicknesses.

It should be understood that the foregoing relates to only a preferred embodiment of the invention, which have been by way of example only and that it is intended to cover all changes and modifications of the example of the invention herein chosen for the purpose of the disclosure, which do not constitute departures from the spirit and scope of the invention.

The invention claimed is:

1. Apparatus for continuously and automatically attaching a magnetic tape to a marginal edge of a motion picture film, comprising:

a rotatable supply reel of said film;

a motor driven milling cutter;

a rotating guide assembly on which said film is entrained for passing said film from said reel before said milling cutter whereby a groove of width the same as the tape and depth less than the thickness of the tape, is cut in said film;

a rotatable applicator for applying an adhesive binder, said applicator being disposed adjacent to said rotating guide assembly;

means for wetting said applicator with said binder continuously while said applicator deposits a layer of said adhesive binder in said groove and while said film carried by said guide moves continuously before said applicator;

a transport roller means;

a tape conveying means arranged to insert said tape in the adhesive coated groove to form a composite film and tape while said composite tape and film are moved around said transport roller means;

a plurality of calendar rollers disposed circumferentially of said transport roller means to apply pressure to the moving composite film and tape for securing said tape in said groove with the outer surface of said tape flush with the adjacent outer surface of said film; and takeup means for continuously receiving said calendered film and tape.

2. Apparatus as defined in claim 2, further comprising buffing means for polishing the surface of said tape as said composite film and tape passes from said transport roller means to said takeup means.

3. Apparatus as defined in claim 2 further comprising a vacuum system having outlets located adjacent said milling cutter and buffing means to remove loose particles from said film and said composite film and tape respectively.

4. Apparatus as defined in claim 1, wherein said guide assembly comprises a first disk fixed on a shaft, and a second disk spaced axially therefrom and having a cylindrical portion defining a channel for supporting said film between said disks; and spring means urging said second disk and said cylindrical portion axially toward said first disk to accommodate the width of said channel to minute variations in width of said film, so that said groove is precisely formed in said film at one marginal edge thereof.

5. Apparatus as defined in claim 4, further comprising tensioning and braking means associated with said tape conveying means for feeding said tape at proper tension and speed to said groove in said film.

6. Apparatus as defined in claim 5, wherein said calendaring rollers are spaced progressively closer distances radially to said transport roller means for applying progressively greater pressure to said tape in said groove.

7. Apparatus as defined in claim 6, further comprising buffing means for polishing the surface of said tape as said composite film and tape pass from said transport roller means to said takeup means.

8. Apparatus as defined in claim 7, further comprising a vacuum system having outlets located adjacent said milling cutter and said buffing means to remove loose particles from said film and said composite film and tape respectively.

References Cited

UNITED STATES PATENTS

| | | | |
|---|---|---|---|
| 2,628,929 | 2/1953 | Persoon et al. | 156—554 |
| 2,982,003 | 5/1961 | Weberling | 156—554 |
| 3,713,947 | 1/1973 | Hawkins | 156—578 |
| 3,756,896 | 9/1973 | Kono | 156—554 |

DOUGLAS J. DRUMMOND, Primary Examiner

U.S. Cl. X.R.

156—554, 578